(12) United States Patent
Moran et al.

(10) Patent No.: US 12,397,736 B2
(45) Date of Patent: Aug. 26, 2025

(54) ROOF RAIL AIRBAG RESTRICTOR WRAP

(71) Applicant: ZF Passive Safety Systems US Inc., Washington, MI (US)

(72) Inventors: Dylan Moran, Rochester Hills, MI (US); Ernesto Uribe, Sterling Heights, MI (US); Patrick Landis, Washington, MI (US)

(73) Assignee: ZF PASSIVE SAFETY SYSTEMS, US INC., Washington, MI (US)

( * ) Notice: Subject to any disclaimer, the term of this patent is extended or adjusted under 35 U.S.C. 154(b) by 0 days.

(21) Appl. No.: 18/417,086

(22) Filed: Jan. 19, 2024

(65) Prior Publication Data

US 2025/0236255 A1 Jul. 24, 2025

(51) Int. Cl.
| | |
|---|---|
| *B60R 21/2334* | (2011.01) |
| *B60R 21/201* | (2011.01) |
| *B60R 21/213* | (2011.01) |
| *B60R 21/2165* | (2011.01) |
| *B60R 21/217* | (2011.01) |
| *B60R 21/232* | (2011.01) |
| *B60R 21/237* | (2006.01) |

(52) U.S. Cl.
CPC ........ *B60R 21/2334* (2013.01); *B60R 21/201* (2013.01); *B60R 21/213* (2013.01); *B60R 21/2165* (2013.01); *B60R 21/2176* (2013.01); *B60R 21/232* (2013.01); *B60R 21/237* (2013.01)

(58) Field of Classification Search
CPC . B60R 21/201; B60R 21/213; B60R 21/2165; B60R 21/2176; B60R 21/232; B60R 21/2334; B60R 21/237; B60R 2021/161
See application file for complete search history.

(56) References Cited

U.S. PATENT DOCUMENTS

| | | | | |
|---|---|---|---|---|
| 5,765,867 | A * | 6/1998 | French | B60R 21/201 280/743.1 |
| 6,481,744 | B2 * | 11/2002 | Melia | B60R 21/201 280/730.2 |
| 6,616,587 | B2 * | 9/2003 | Kleeberger | B60R 21/201 493/449 |
| 6,626,456 | B2 * | 9/2003 | Terbu | B60R 21/20 280/730.2 |
| 6,889,999 | B2 * | 5/2005 | Dominissini | B60R 21/213 280/730.2 |

(Continued)

*Primary Examiner* — Laura Freedman
(74) *Attorney, Agent, or Firm* — Tarolli, Sundheim, Covell & Tummino LLP (57) ABSTRACT

An apparatus for helping to protect an occupant of a vehicle includes a curtain airbag having a packaged condition in which the curtain airbag is rolled and/or folded for installation in the vehicle. The curtain airbag is configured to inflate and deploy between the occupant and a side structure of the vehicle. A deployment wrap includes a sheet of material configured as a loop to extend around the curtain airbag in the packaged condition. The deployment wrap is configured to undergo tension in response to inflation of the curtain airbag. The tension acts on the curtain airbag to help control the initial deployment of the curtain airbag. The deployment wrap is rolled up along its length, forming a roll that takes up the material of the deployment wrap and causes the deployment wrap to constrict around the curtain airbag.

20 Claims, 7 Drawing Sheets

(56) References Cited

U.S. PATENT DOCUMENTS

| | | | | |
|---|---|---|---|---|
| 7,083,188 B2* | 8/2006 | Henderson | B60R 21/201 | 280/730.2 |
| 7,163,231 B2* | 1/2007 | Kumagai | B60R 21/213 | 280/730.2 |
| 7,568,730 B2* | 8/2009 | Kwon | B60R 21/205 | 280/743.2 |
| 7,731,224 B2* | 6/2010 | Enriquez | B60R 21/201 | 280/730.2 |
| 7,748,734 B2* | 7/2010 | Wilmot | B60R 21/232 | 280/730.2 |
| 7,823,914 B2* | 11/2010 | Cheal | B60R 21/201 | 280/730.2 |
| 7,878,539 B2* | 2/2011 | Maripudi | B60R 21/201 | 280/740 |
| 8,002,310 B2* | 8/2011 | Quach | B60R 21/237 | 280/730.2 |
| 8,083,254 B2* | 12/2011 | Enders | B60R 21/2338 | 280/743.2 |
| 8,272,664 B2* | 9/2012 | Benny | B60R 21/201 | 280/743.1 |
| 8,276,936 B2* | 10/2012 | Shimizu | B60R 21/2165 | 280/732 |
| 8,596,679 B2* | 12/2013 | Horikawa | B60R 21/217 | 280/743.2 |
| 8,727,371 B2* | 5/2014 | Ochiai | B60R 21/2176 | 280/730.2 |
| 9,637,081 B2* | 5/2017 | Ryan | B60R 21/21 | |
| 11,292,414 B2* | 4/2022 | Schaefer | B60R 21/217 | |
| 11,628,796 B2* | 4/2023 | Moran | B60R 21/213 | 280/728.2 |
| 11,760,298 B2* | 9/2023 | Kosten | B60R 21/237 | 280/728.2 |
| 11,814,000 B1* | 11/2023 | Cook | B60R 21/201 | |
| 2024/0067120 A1* | 2/2024 | Cook | B60R 21/205 | |

* cited by examiner

ROOF RAIL AIRBAG RESTRICTOR WRAP

TECHNICAL FIELD

This disclosure relates to an apparatus for helping to protect an occupant of a vehicle. More particularly, this disclosure relates to a restrictor wrap for a roof rail airbag that is inflatable between a vehicle side structure and a vehicle occupant.

BACKGROUND

It is known to inflate an inflatable vehicle occupant protection device to help protect a vehicle occupant. One particular type of inflatable vehicle occupant protection device is a roof rail airbag, sometimes referred to as a curtain airbag. The curtain airbag is mounted on or adjacent the vehicle roof rail and is inflatable away from the vehicle roof between a side structure of the vehicle and a vehicle occupant. In an inflated condition, the curtain airbag extend from adjacent the roof down to the vehicle belt line, and can cover structures such as vehicle pillars and window openings.

When installed in a vehicle, curtain airbags are stored behind vehicle interior trim pieces. During deployment, care must be exercised to ensure that the curtain airbag deploys over the trim pieces, i.e., inboard of the trim pieces between the trim pieces and the vehicle occupants. This not only helps the airbag clear the trim pieces, it also allows the airbag to reach the desired inflated and deployed condition within the time required to afford the occupant the desired level of protection.

SUMMARY

An apparatus for helping to protect an occupant of a vehicle includes a curtain airbag having a packaged condition in which the curtain airbag is rolled and/or folded for installation in the vehicle. The curtain airbag is configured to inflate and deploy between the occupant and a side structure of the vehicle. A deployment wrap includes a sheet of material configured as a loop to extend around the curtain airbag in the packaged condition. The deployment wrap is configured to undergo tension in response to inflation of the curtain airbag. The tension acts on the curtain airbag to help control the initial deployment of the curtain airbag. The deployment wrap is rolled up along its length, forming a roll that takes up the material of the deployment wrap and causes the deployment wrap to constrict around the curtain airbag.

According to one aspect, the deployment wrap is rupturable in response to curtain airbag inflation.

According to another aspect, alone or in combination with any other aspect, the deployment wrap can include a portion that extends around the packaged curtain airbag. According to this aspect, the roll can be located outside the portion that extends around the packaged curtain airbag and positioned above the packaged curtain airbag, opposite a deployment direction of the curtain airbag.

According to another aspect, alone or in combination with any other aspect, the apparatus can include a retainer for maintaining the roll while the curtain airbag is in the packaged condition.

According to another aspect, alone or in combination with any other aspect, the apparatus can also include an inflator configured to direct inflation fluid into the curtain airbag. According to this aspect, the deployment wrap can be configured to extend around the inflator and the curtain airbag in the packaged condition.

According to another aspect, alone or in combination with any other aspect, the deployment wrap can have a diameter greater than a circumference of the curtain airbag in the packaged condition along with the inflator. According to this aspect, the roll can be configured to take up deployment wrap material in excess of the curtain airbag in the packaged condition together with the inflator to draw the deployment wrap against the curtain airbag in the packaged condition and inflator.

According to another aspect, alone or in combination with any other aspect, the wrap can be configured to wrap around the curtain airbag in an area where inflation fluid is directed into the curtain airbag from an inflator.

According to another aspect, alone or in combination with any other aspect, the deployment wrap has a diameter greater than a circumference of the curtain airbag in the packaged condition. According to this aspect, the roll can be configured to take up deployment wrap material in excess of the curtain airbag in the packaged condition to draw the deployment wrap against the curtain airbag in the packaged condition.

According to another aspect, alone or in combination with any other aspect, the diameter of the deployment wrap can be configured so that the deployment wrap helps control curtain airbag deployment until the curtain airbag clears a vehicle trim piece behind which the curtain airbag is concealed in the stored condition. According to this aspect, the deployment wrap can be configured to rupture once the curtain airbag clears the vehicle trim piece. The curtain airbag can be configured to extend along a vehicle roof rail in the stored condition, in which case the trim piece can be a roof rail trim piece.

According to another aspect, alone or in combination with any other aspect, the curtain airbag can be folded to produce a Z folded portion including a plurality of Z folded pleats in the curtain airbag in the packaged condition. According to this aspect, the deployment wrap can be configured to restrict lateral deployment of the Z folded portion of the curtain airbag during initial stages of deployment. Additionally, according to this aspect, the deployment wrap can be configured to help prevent one or more upper pleats of the Z folded portion to displace and deploy below one or more lower pleats of the Z folded portion during the initial stages of deployment of the curtain airbag.

According to another aspect, alone or in combination with any other aspect, the deployment wrap can be configured to rupture along an upper end portion so that the wrap extends around the Z folded portion and moves with the Z folded portion in the deployment direction after the rupture. According to this aspect, the deployment wrap can be configured to help control deployment of the curtain airbag after the deployment wrap ruptures.

According to another aspect, alone or in combination with any other aspect, the deployment wrap can be configured to along a tear seam configured to rupture once the roll unrolls in response to curtain airbag deployment.

According to another aspect, alone or in combination with any other aspect, the tear seam can extend along the length of the deployment wrap and can be configured to be positioned at an inner end of the roll.

According to another aspect, alone or in combination with any other aspect, an airbag module can include the apparatus according to any of the aforementioned aspects, and an inflator that is actuatable to inflate the curtain airbag. According to this aspect, a vehicle safety system can include the airbag module, sensors configured to detect vehicle conditions indicative of the occurrence of an event for which deployment of the curtain airbag is desired, and a controller operatively connected to the sensors and configured to determine the occurrence of the event for which deployment of the curtain airbag is desired in response to signals from the sensors. According to this aspect, the controller can be configured to actuate the inflator in response determining the occurrence of the event for which deployment of the curtain airbag is desired.

BRIEF DESCRIPTION OF THE DRAWINGS

The foregoing and other features of the present invention will become apparent to one skilled in the art to which the subject disclosure relates upon consideration of the following description with reference to the accompanying drawings, in which.

DESCRIPTION

FIGS. 1-4 illustrate an example configuration of a vehicle safety system 10 and apparatus 12 for helping to protect an occupant 14 of a vehicle 20. The system 10 and apparatus 12 includes an inflatable vehicle occupant protection device, in the form of an airbag 50. In the example configuration of FIGS. 1 and 2, the airbag 50 is a curtain airbag that has a stored condition in which the airbag is packaged in an airbag module 60 that is mounted at or along an intersection of a vehicle roof 22 and a side structure 24 of the vehicle 20. The curtain airbag 50 is inflatable from the stored condition of FIGS. 1 and 3 downward to the deployed condition of FIGS. 2 and 4, in which the airbag is positioned between the occupant 14 and the side structure 24.

Figure 1:
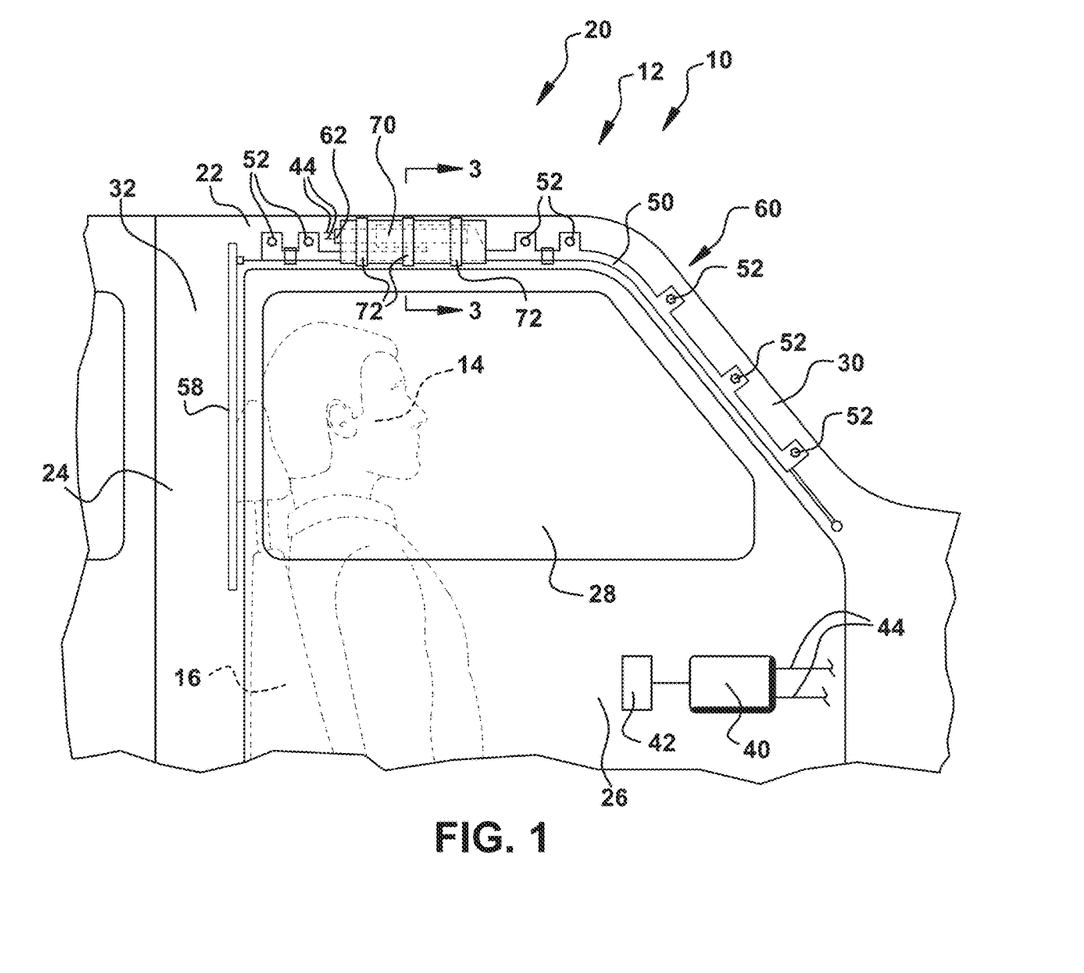
FIG. 1 is a schematic side view illustrating an apparatus for helping to protect an occupant of a vehicle in a deflated and stored condition, according to an example configuration.
Figure 2:
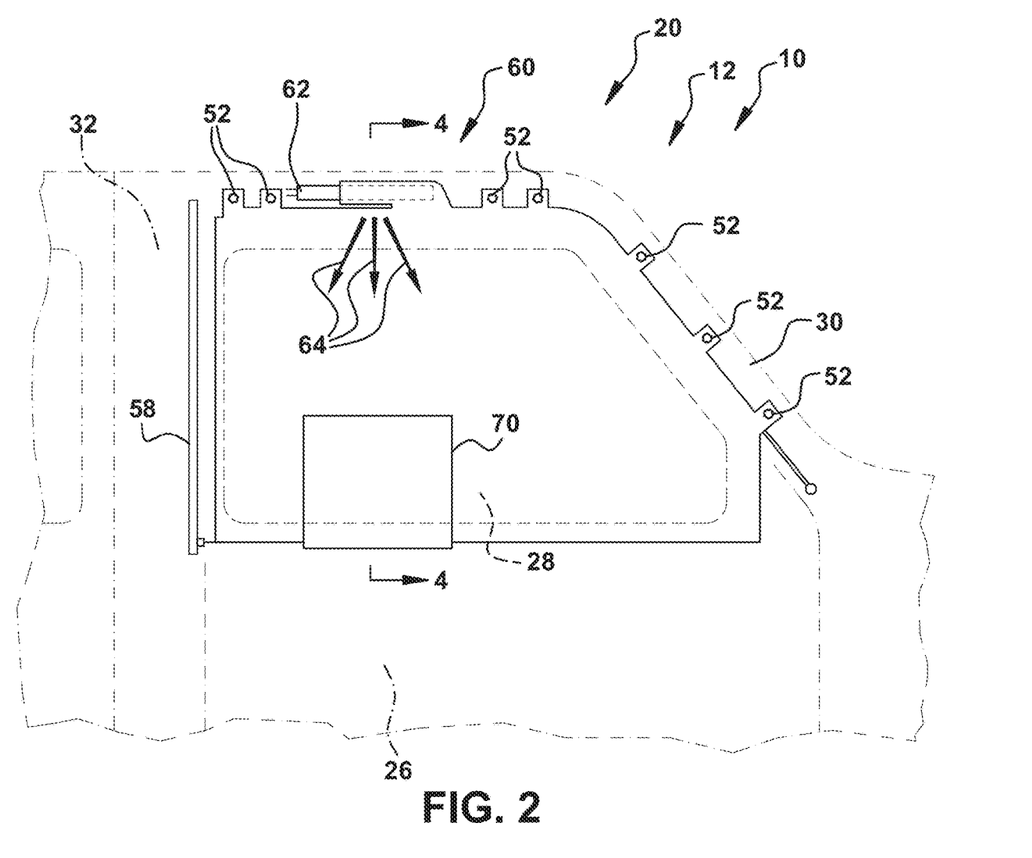
FIG. 2 is a schematic side view of the apparatus of FIG. 1 in an inflated and deployed condition.

In the example configuration of FIGS. 1 and 2, the curtain airbag 50 extends along the side structure 24 adjacent an occupant of a front row seat 16. The curtain airbag 50 thus covers portions of the side structure 24, such as the door 26, window/window opening 28, A-pillar 30, and B-pillar 32. The curtain airbag 50 could, however, extend further along the length of the vehicle 20 and cover, for example, occupants of second or third row seats, their respective doors, window openings, and the C-pillar, D-pillar, etc.

The airbag module 60 also includes an inflator 62 for providing inflation fluid for inflating and deploying the curtain airbag 50. The inflator 62 can be secured to the curtain airbag 50 in a variety of manners. In the example configuration illustrated in the figures, the curtain airbag 50 includes a neck or throat 56 configured to receive the inflator 62 so that a discharge end thereof is exposed to the inflatable volume inside the airbag. A clamp can encircle the throat 56 and the inflator 62 to secure the two together.

Figure 5:
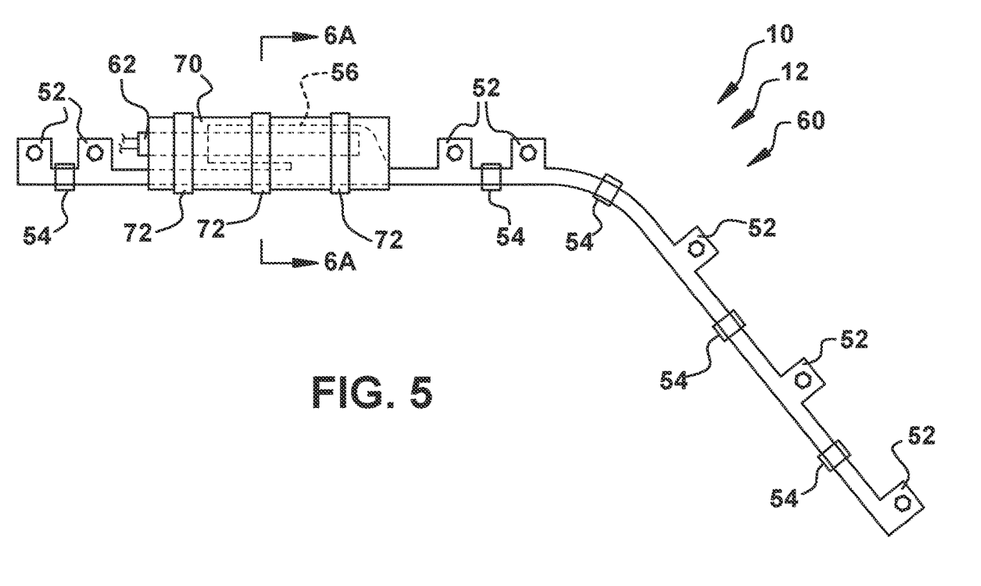
FIG. 5 is a schematic side view of an airbag module that forms a portion of the apparatus of FIGS. 1-4.

The airbag module 60 has a packaged condition in which the curtain airbag 50 is folded and/or rolled so that the module can be installed as shown in FIG. 1. The curtain airbag 50 can be maintained in the packaged condition in a variety of manners, such as tape 54 (see FIG. 5) that is wrapped around the package at spaced locations along its length. Alternative structures, such as sheaths or fabric wrapping structures, can also be implemented. The packaged condition of the airbag module 60 is shown in FIG. 5.

In the packaged condition, the airbag module 60 is mounted to the vehicle 20 along the intersection of the roof and the side structure 24, for example, along a roof rail 34 and the A-pillar 30. To facilitate this, the curtain airbag 50 and/or the airbag module 60 can include mounting tabs 52 for receiving fasteners, such as screws or bolts, for connecting the airbag module to the vehicle. The apparatus 12 can also include a track mechanism 58 for securing a rear edge or corner of the curtain airbag 50 to the vehicle side structure 24.

The inflator 62 is actuatable to provide inflation fluid to an inflatable volume of the airbag 50 to deploy the airbag to the inflated condition. The inflator 62 can be of any known type, such as stored gas, solid propellant, augmented or hybrid. The system 10 and apparatus 12 also includes a controller, illustrated schematically at 40 in FIG. 1, for providing an actuation signal in response to signals from sensors 42 responsive to a crash event. The sensors 42 can include crash sensors, such as accelerometers, for sensing vehicle crash conditions. The sensors 42 can also include condition sensors for sensing vehicle and/or occupant conditions, such as seat weight sensors, seat position sensors, seatbelt buckle latch sensors, and occupant presence sensors. The inflator 62 is operatively connected to the controller 40 via lead wires 44.

The controller 40 can provide the actuation signal to the inflator 62 in response to one or more of the sensors 42 detecting the occurrence of a vehicle crash event. At the same time, the controller 40 can tailor airbag deployment in response to vehicle and/or occupant conditions determined via the sensors 42.

The curtain airbag 50 can be constructed of any suitable material, such as nylon, e.g., woven nylon 6-6 yarns, and can be constructed in any suitable manner. For example, the curtain airbag 50 can have a one-piece woven (OPW) construction in which overlying panels are woven simultaneously and interwoven at selected locations to define single layer seams that define the inflatable volume and any chambers thereof. As another example, the curtain airbag 50 can include one or more pieces or panels of material having portions interconnected by known means, such as stitching, ultrasonic welding, heat bonding, or adhesives, to form the airbag. The curtain airbag 50 can be uncoated, coated with a material, such as a gas impermeable urethane, or laminated with a material, such as a gas impermeable film. The curtain airbag 50 thus can have a gas-tight or substantially gas-tight construction. Those skilled in the art will appreciate that alternative materials, such as polyester yarn, and alternatives coatings, such as silicone, can also be used to construct the curtain airbag 50.

Figure 3:
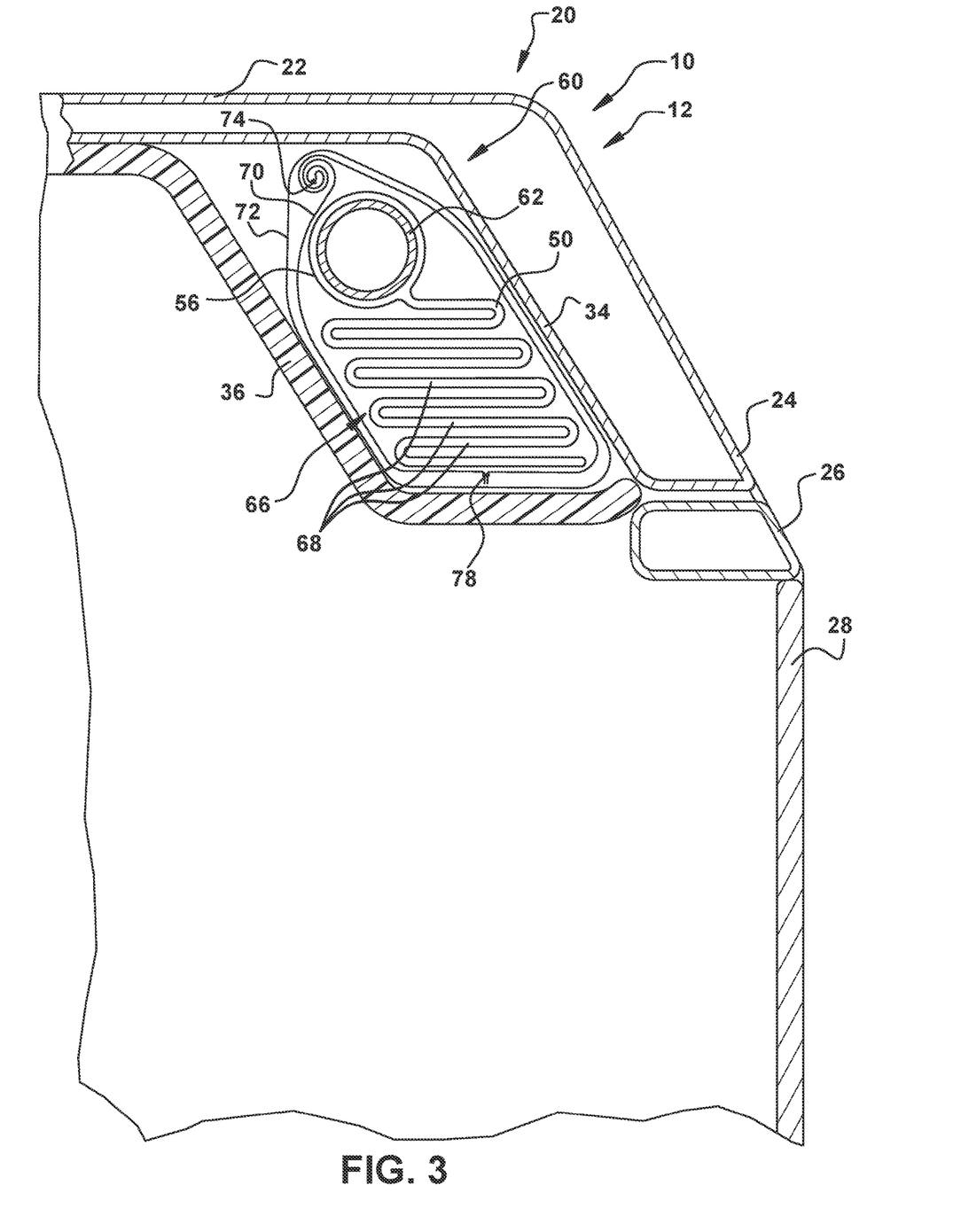
FIG. 3 is a schematic section view taken generally along line 3-3 in FIG. 1.
Figure 4:
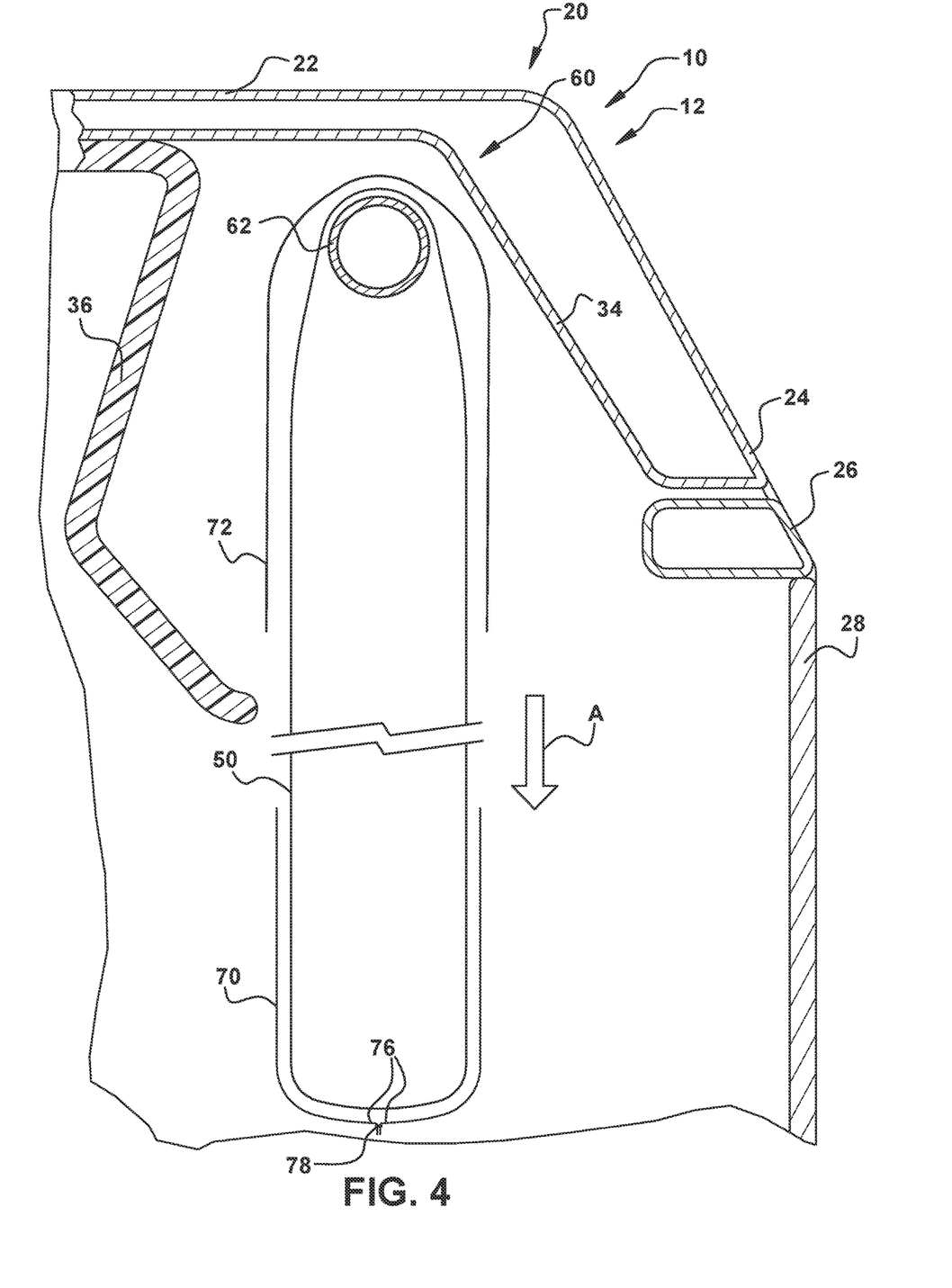
FIG. 4 is a schematic section view taken generally along line 4-4 in FIG. 2.

Upon sensing the occurrence of an event for which inflation of the curtain airbag 50 is desired, such as a vehicle collision, the sensors 42 provide a signal to the controller 40, which actuates the inflator 62 via the lead wires 44. Upon receiving the signal from the controller 40, the inflator 62 is actuated and provides inflation fluid to the inflatable volume of the curtain airbag 50 in a known manner. The curtain airbag 50 inflates from the stored condition (FIGS. 1 and 3) to the inflated and deployed condition (FIGS. 2 and 4). The curtain airbag 50, while inflated, helps protect the vehicle occupant 14 from impacting parts of the vehicle 20, such as the side structure 24.

As shown in FIG. 4, the curtain airbag 50 is packaged in what is referred to as a Z fold, that is, the curtain is folded back-and-forth in a manner along its length to form a Z folded portion 66 including a series of Z folded pleats 68 that mimic a series of Zs stacked on top of each other. In the packaged condition, the airbag module 60 is concealed behind one or more trim pieces 36. As shown in FIG. 3, the trim piece 36 is a roof rail trim piece. Other trim pieces 36 that can help conceal the airbag module 60 include A-pillar trim pieces, B-pillar trim pieces, and a vehicle headliner.

Z folded curtain airbags can be advantageous in that they can adapt well to vehicle architecture and airbag module designs. Z folded curtain airbags can also be advantageous because they offer quick inflation/deployment times. Rolled curtain airbags must unroll during deployment, which necessitates overcoming inertia and rolling resistance. On the other hand, Z folded curtain airbags offer less resistance and, in effect, simply expand longitudinally during deployment.

Z folded curtain airbags can, however, be unstable and have some unpredictability during deployment. This can be especially the case at locations where the curtain airbag directly receives the flow of inflation fluid from the inflator. Due to the high inflation fluid flow rates directed to these areas, and the energy placed on the curtain airbag, deployment is unpredictable, especially given that the adjacent trim piece offers resistance prior to and during displacement. For example, aided by the resistance offered by the trim piece, the upper portion of the curtain airbag 50 can displace the lower portion laterally inboard or outboard, causing the airbag to buckle. When this occurs, pleats 68 of the upper inflating portion of the airbag 50 can get beneath lower ones of the pleats, causing the Z folded portion 66 it to take on a folded or kinked configuration, e.g., taking on a V shape or other distortions that further impede the required rapid deployment.

To account for these potential issues, the system 10 and apparatus 12 include a deployment wrap 70 configured to help control the deployment of the curtain airbag 50 during the initial stages of deployment. The deployment wrap 70 can, for example, be configured to help control deployment of the curtain airbag 50 until it clears the trim piece 36. As shown in FIGS. 1, 2, and 5, the deployment wrap 70 can extend along a portion of the curtain airbag 50 that coincides with the inflator 62, specifically the portion or chamber(s) of the airbag that receive inflation fluid from the inflator, as indicated generally by the inflation fluid discharge arrows 64 in FIG. 2.

Figures 6A, 6B:
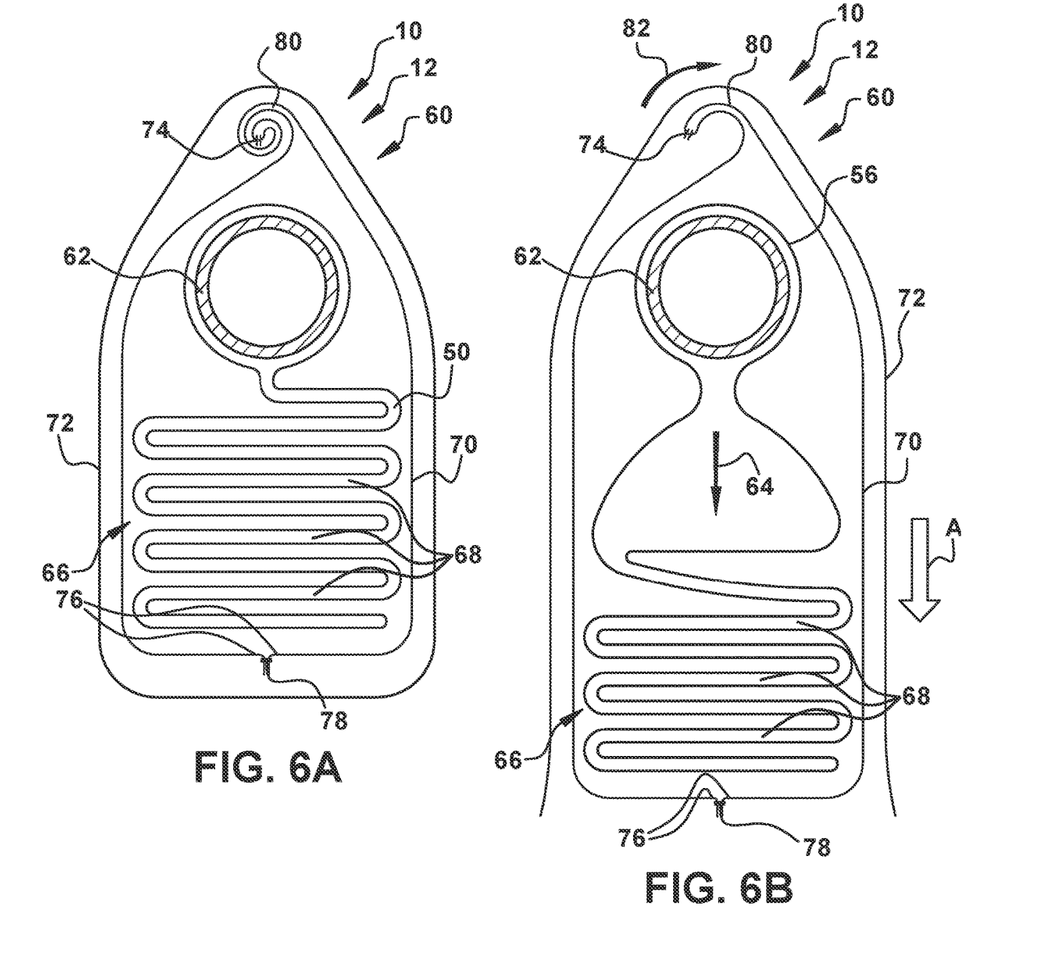
FIG. 6A is a schematic section view taken generally along line 6A-6A in FIG. 5.
FIGS. 6B-6D are schematic section views illustrating the airbag module of FIGS. 5 and 6A in different stages during deployment.
Figure 6C:
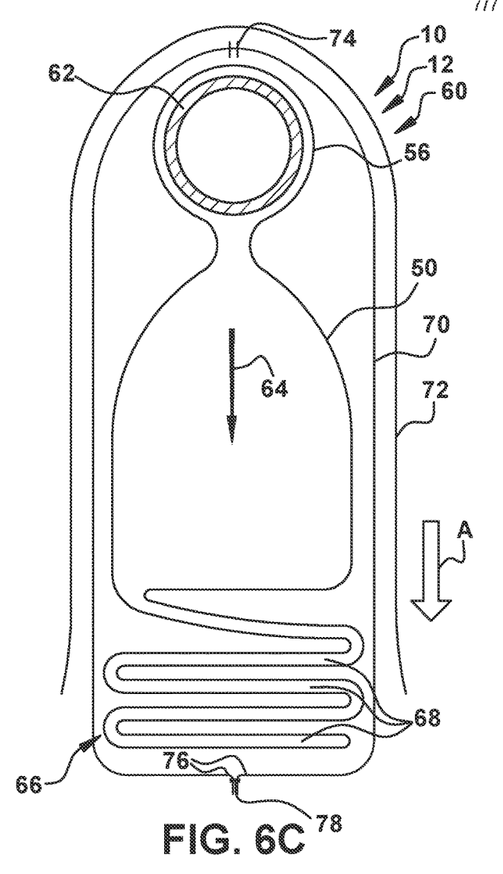
Figure 6D:
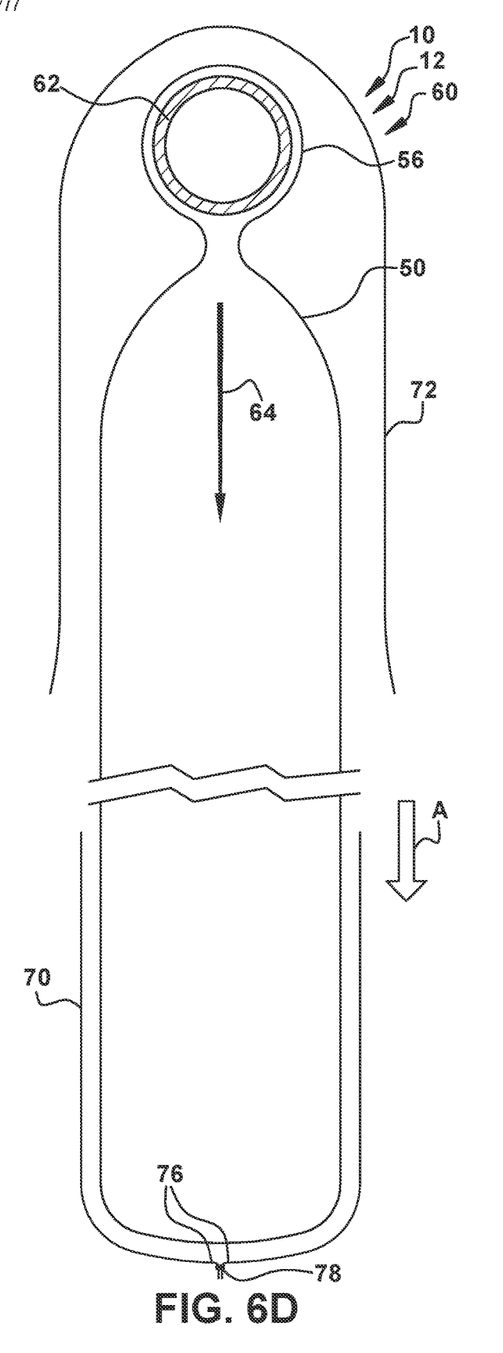
Figure 7:
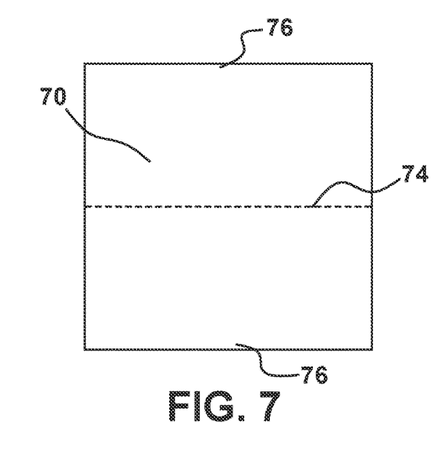
FIG. 7 is a plan view of a deployment sleeve the forms a portion of the apparatus.

Referring to FIG. 7, the deployment wrap 70 can be formed from a simple piece of material, such as rectangular sheet of fabric, such as airbag fabric. The deployment wrap 70 has a length and opposite end portions 76 that are interconnected, for example by stitching 78 (see, e.g. FIGS. 3, 4, and 6A-6D), to place the deployment wrap in the form of a loop. The deployment wrap 70 includes a tear seam 74 that can, for example, be formed as a perforation that extends across the width of the fabric sheet, for example, at the midpoint between the ends 76.

In an alternative construction, the tear seam could be formed by the stitching 78 that interconnects the end portions 76. This would avoid the need to form both the tear seam 74 and the stitching 78 connecting the ends 76, as that stitching 78 would serve both purposes, i.e., forming the loop and the tear seam. The tear seam 74 is shown in the figures in the proper position on the airbag module 60. If the stitched tear seam is implemented, the deployment wrap would be slid/rotated/adjusted to position the stitched tear seam at the location where the perforated tear seam 74 is shown.

The manner in which the airbag module 60 is placed in the packaged condition, and the manner in which its components act during deployment is best shown in FIGS. 6A-6D. In these figures, the components of the airbag module 60 are shown schematically with space between elements for purposes of clarity in describing the module. It should be noted and appreciated that, in practice, it can be desirable to tightly fold the curtain airbag 50 and compress the airbag module 60 so that its components, i.e., the curtain airbag, inflator 62, and deployment wrap 70, are compressed tightly against each other.

The deployment wrap 70 is configured so that the loop formed thereby has a diameter that is greater, even significantly so, than the cross-sectional periphery of the airbag module 60 in the packaged condition. This configuration serves several purposes that lend definite advantages to the configuration and operation of the airbag module 60. For example, the large diameter of the deployment wrap 70 allows it to be slid onto/over the folded curtain airbag 50 and positioned over the airbag and inflator 62 without difficulty. Once positioned, the deployment wrap 70 can be tightened, as described below, so that the desired packaging is achieved.

The diameter of the deployment wrap 70 is also configured so that it permits the curtain airbag 50 to deploy a predetermined distance before the wrap becomes tensioned and ruptures along the tear seam 74. This allows the deployment wrap 70 to constrain the pleats 68 of the Z folded portion 66 of the curtain airbag 50 during the initial stages of deployment to inhibit unwanted distortions of the curtain airbag and to control its trajectory. For example, the diameter of the deployment wrap 70 can be selected so that it controls deployment of the curtain airbag 50 until after it clears the trim piece 36. As another example, the diameter of the deployment wrap 70 can be selected so that it inhibits deployment of the curtain airbag 50 during an initial phase of deployment where inflation and deployment forces can produce unfolding of the Z-folded pleats 68 of the airbag. In this instance, the deployment wrap 70 can, for example, inhibit inboard and/or outboard deployment of the Z-folded pleats 68.

Advantageously, the airbag module 60, more specifically the deployment wrap 70, is configured to provide two distinct functions that could be considered to be competing. First, the deployment wrap 70 is configured to package the curtain airbag 50 tightly, so that the airbag module 60 has a compact configuration that facilitates installation in the available space. Second, the deployment wrap 70 is configured to perform during deployment as if it had a loose fit, providing constraint while allowing a predetermined degree of airbag deployment to take place before rupturing, so as to produce a desired degree of curtain airbag deployment control.

As shown in FIG. 6A, in the packaged condition of the airbag module 60, the deployment wrap 70 includes a roll 80 located at the top (as viewed in FIG. 6A) of the airbag module 60, above the inflator 62 and positioned opposite the Z folded portion 66 of the curtain airbag 50. The roll 80 could, however, be formed at other locations relative to the curtain airbag 50 and/or inflator 62. The roll 80 is formed by grasping, pinching, or otherwise retaining a small portion of the deployment wrap 70 along its length and then rolling-up that portion to create the roll. As shown, the portion that forms the roll 80 includes the tear seam 74. The roll 80 is therefore formed as a portion of the deployment wrap 70 that is rolled upon itself. This can be done, for example, by using a folding rod or other tool that allows the roll 80 to be formed tightly and uniformly along the length of the deployment wrap 70.

It is the roll 80 in combination with the diameter of the deployment wrap 70, that provide the packaging and deployment control functions. With the deployment wrap 70 is positioned around the inflator 62 and the folded curtain airbag 50, the roll 80 is formed. As the roll 80 is formed, it takes up the loose slack in the deployment wrap 70, which causes the wrap to compress the folded curtain airbag 50 and form the tightly packaged airbag module 60. With the roll 80 formed and the airbag module 60 tightly packaged, retainers 72, such as tape, wrap, or sheath, can be installed to maintain the roll 80 and the tightly packaged curtain airbag 50.

Again, being reminded that FIG. 6A is schematic and intentionally shows space between the elements of the airbag module 60, the application of the roll 80 to the deployment wrap 70 compresses the curtain airbag 50 in the packaged condition. Thus, in the packaged condition of the curtain airbag module 60, the curtain airbag 50 can be tightly compressed. Additionally, while the roll 80 shows a certain number of roll layers, the number of roll layers, and therefore the amount of the deployment wrap 70 that is taken up by the roll, can vary depending on factors such as the degree of curtain airbag deployment that is desired before the tear seam 74 ruptures.

The tape 72 maintains the roll 80 and the compression forces acting on the curtain airbag 50. Referring to FIG. 6B, when the inflator 62 is actuated, inflation fluid enters the curtain airbag 50, as indicated generally by the arrow 64 in the figure (see also FIG. 2). The inflation fluid begins to expand the airbag 50 and move the yet-to-be-inflated pleats 68 of the Z folded portion 66 downward in the deployment direction (arrow A) as viewed in FIG. 6B, rupturing the tape 72, as shown. While this occurs, the roll 80 of the deployment wrap 70 remains intact, but begins to unroll. While this occurs, the deployment wrap 70 maintains some influence and control over the deploying curtain airbag 50, and thus helps control its trajectory and avoid unwanted distortions of the pleats 68 of the Z folded portion 66. The roll 80 unrolls (see arrow 82) in response to the inflation, expansion, and deployment of the curtain airbag 50.

The roll 80 continues to unroll as the curtain airbag 50 inflates and deploys. Because the roll 80 is tightly wound, it offers a degree of resistance to unrolling, which translates to tension on the deployment wrap 70, which resists unfettered movement of the lower portions of the deploying curtain airbag 50. The lower end of the deployment wrap restrains downward movement of the pleats 68 of the Z folded portion 66, while the tensioned sides of the deployment wrap resist inboard/outboard movement of the pleats 68.

Referring to FIG. 6C, once the roll 80 unwinds completely, the deployment wrap 70 becomes fully extended. At this point, the curtain airbag 50 has cleared the trim piece 36 and avoided the undesirable folding/distortion. The length of the deployment wrap 70 and/or the number of rolled layers in the roll 80 can be configured to control the degree of deployment that takes place prior to this occurring. The curtain airbag 50 reaches the desired stage of deployment at or about the same time that the tear seam 74 ruptures, as shown in FIG. 6C.

Rupture of the tear seam 74 allows the curtain airbag 50 to continue inflating and deploying, as shown in FIG. 6D, taking the ruptured deployment wrap 70 with it. Advantageously, even after the tear seam 74 ruptures, the deployment wrap 70, moves with the deploying curtain airbag 50 and continues to help control the deployment of the Z folded portion 66. Configured to rupture from the top and travel downward with the curtain airbag 50 (as viewed in the figures), the deployment wrap 70 continues to apply some tension around the uninflated pleats 68. Being positioned between the respective portions of the deployment wrap 70, the pleats 68 are trapped by the downward force and the friction caused by the wrap's sliding down the outside of the pleated portion 66 as it inflates.

The deployment wrap 70, configured with the roll 80, produces an initially high-degree of restriction on the Z folded portion 66 that counters the initially high deployment forces during the first stages of curtain airbag 50 inflation. As inflation proceeds and the roll 80 begins to unroll, the degree of restriction, while still present, begins to diminish as inertia is overcome and the wrap 70 deploys with the airbag 50. At the same, time inflation forces become more normalized as deployment proceeds. Thus, the implementation of the deployment wrap 70 and its rolled-up top 80 produces a unique solution in providing restriction focused on a certain portion of the bag, i.e., the Z folded portion 86. This focused restriction is unique in that the degree or restriction is in-tune with the deployment forces that might result in the undesired deployment trajectory of the pleats 68 of the Z folded portion 66.

As a result, the implementation of the roll 80 bolsters the ability of the deployment wrap 70 to help control curtain airbag deployment during the initial stages, for example, until the trim piece 36 is cleared. Thereafter, having established the proper trajectory and cleared the trim piece 36, the curtain airbag 50 is allowed to finish inflating and deploying. The deployment wrap 70 thus helps direct the curtain airbag 50 to deploy down in vehicle in a controlled manner that maximizes repeatability and speed, while preventing the Z folded portion 66 from becoming distorted and inhibiting the rapid curtain airbag deployment.

Testing has showed that the tightness and number of rolls of the roll 80 as well as the length of the deployment wrap 70 are factors that contributed to the improvement of the curtain airbag 50 trajectory. While the roll 80 proved to be a simple method for implementing controlled tension to the rest of the deployment wrap 70, alternative methods could be implemented. For example, elastic tape or bands could be used to offer controlled resistance to curtain airbag 50 deployment.

From the above description of the invention, those skilled in the art will perceive improvements, changes and modifications. For example, while the deployment wrap is shown as extending along a portion of the length of the curtain airbag that coincides with the length of the inflator, the deployment wrap could extend along other portions of the length of the airbag. Additionally, although a single deployment wrap is shown, the airbag module could include multiple deployment wraps. These and other improvements, changes and modifications within the skill of the art are intended to be covered by the appended claims.

Having described the invention, the following is claimed:

1. An apparatus for helping to protect an occupant of a vehicle, comprising:
   a curtain airbag having a packaged condition in which the curtain airbag is rolled and/or folded for installation in the vehicle, the curtain airbag being configured to inflate and deploy between the occupant and a side structure of the vehicle; and a deployment wrap comprising a sheet of material configured as a loop to extend around the curtain airbag in the packaged condition, wherein the deployment wrap is configured to undergo tension in response to inflation of the curtain airbag, the tension acting on the curtain airbag to help control the initial deployment of the curtain airbag by initially restricting deployment of at least a portion of the curtain airbag;

wherein the deployment wrap is rolled up along its length, forming a roll that takes up the material of the deployment wrap and causes the loop of material to constrict around the curtain airbag, and wherein the wrap is configured to wrap around the curtain airbag in an area where inflation fluid is directed into the curtain airbag from an inflator, and to leave unwrapped remaining areas of the curtain airbag, which comprise a majority of the curtain airbag.

2. The apparatus recited in claim 1, wherein the deployment wrap is rupturable in response to curtain airbag inflation.

3. The apparatus recited in claim 1, wherein the deployment wrap comprises a portion that extends around the packaged curtain airbag, and the roll is located outside the portion that extends around the packaged curtain airbag and positioned above the packaged curtain airbag, opposite a deployment direction of the curtain airbag.

4. The apparatus recited in claim 1, further comprising a retainer for maintaining the roll while the curtain airbag is in the packaged condition, wherein the retainer extends around both the airbag and the deployment wrap.

5. The apparatus recited in claim 1, further comprising the inflator configured to direct inflation fluid into the curtain airbag, wherein the deployment wrap is configured to extend around the inflator and the curtain airbag in the packaged condition.

6. The apparatus recited in claim 5, wherein the deployment wrap has a diameter greater than a circumference of the curtain airbag in the packaged condition along with the inflator, wherein the roll is configured to take up deployment wrap material in excess of the curtain airbag in the packaged condition together with the inflator to draw the deployment wrap against the packaged curtain airbag and inflator.

7. The apparatus recited in claim 1, wherein the deployment wrap has a diameter greater than a circumference of the curtain airbag in the packaged condition, wherein the roll is configured to take up deployment wrap material in excess of the curtain airbag in the packaged condition to draw the deployment wrap against the curtain airbag in the packaged condition.

8. The apparatus recited in claim 7, wherein the diameter of the deployment wrap is configured so that the deployment wrap helps control curtain airbag deployment until the curtain airbag clears a vehicle trim piece behind which the curtain airbag is concealed in the stored condition.

9. The apparatus recited in claim 8, wherein the deployment wrap is configured to rupture once the curtain airbag clears the vehicle trim piece.

10. The apparatus recited in claim 8, wherein the curtain airbag is configured to extend along a vehicle roof rail in the stored condition, wherein the trim piece comprises a roof rail trim piece.

11. The apparatus recited in claim 1, wherein the curtain airbag is folded to produce a Z folded portion comprising a plurality of Z folded pleats in the curtain airbag in the packaged condition.

12. The apparatus recited in claim 11, wherein the deployment wrap is configured to restrict lateral deployment of the Z folded portion of the curtain airbag during initial stages of deployment.

13. The apparatus recited in claim 11, wherein the deployment wrap is configured to help prevent one or more upper pleats of the Z folded portion from displacing and deploying below one or more lower pleats of the Z folded portion during initial stages of deployment of the curtain airbag.

14. The apparatus recited in claim 11, wherein the deployment wrap is configured to rupture along an upper end portion so that the wrap extends around the Z folded portion and moves with the Z folded portion in a deployment direction after the rupture.

15. The apparatus recited in claim 14, wherein the deployment wrap is configured to help control deployment of the curtain airbag after the deployment wrap ruptures.

16. The apparatus recited in claim 1, wherein the deployment wrap is configured to rupture along a tear seam, and wherein the tear seam is configured to rupture after the roll unrolls in response to curtain airbag deployment.

17. The apparatus recited in claim 16, wherein the tear seam extends along the length of the deployment wrap and is configured to be positioned at an inner end of the roll.

18. An airbag module comprising the apparatus recited in claim 1 and the inflator that is actuatable to inflate the curtain airbag.

19. A vehicle safety system comprising the airbag module recited in claim 18, sensors configured to detect vehicle conditions indicative of an occurrence of an event for which deployment of the curtain airbag is desired, and a controller operatively connected to the sensors and configured to determine the occurrence of the event for which deployment of the curtain airbag is desired in response to signals from the sensors, wherein the controller is configured to actuate the inflator in response determining the occurrence of the event for which deployment of the curtain airbag is desired.

20. An apparatus for helping to protect an occupant of a vehicle, comprising:

a curtain airbag having a packaged condition in which the curtain airbag is rolled and/or folded for installation in the vehicle, the curtain airbag being configured to inflate and deploy between the occupant and a side structure of the vehicle; and a deployment wrap comprising a sheet of material configured as a loop to extend around the curtain airbag in the packaged condition, wherein the deployment wrap is configured to undergo tension in response to inflation of the curtain airbag, the tension acting on the curtain airbag to help control the initial deployment of the curtain airbag by initially restricting deployment of at least a portion of the curtain airbag;

wherein the deployment wrap is rolled up along its length, forming a roll that takes up the material of the deployment wrap and causes the deployment wrap to constrict around the curtain airbag, wherein the curtain airbag is folded to produce a Z folded portion comprising a plurality of Z folded pleats in the curtain airbag in the packaged condition, and wherein the deployment wrap is configured to restrict lateral deployment of the Z folded portion of the curtain airbag during initial stages of deployment.

* * * * *